May 1, 1928.
J. H. SEPHTON
1,668,427
BOTTLE MANUFACTURE
Filed May 12, 1927      2 Sheets-Sheet 1
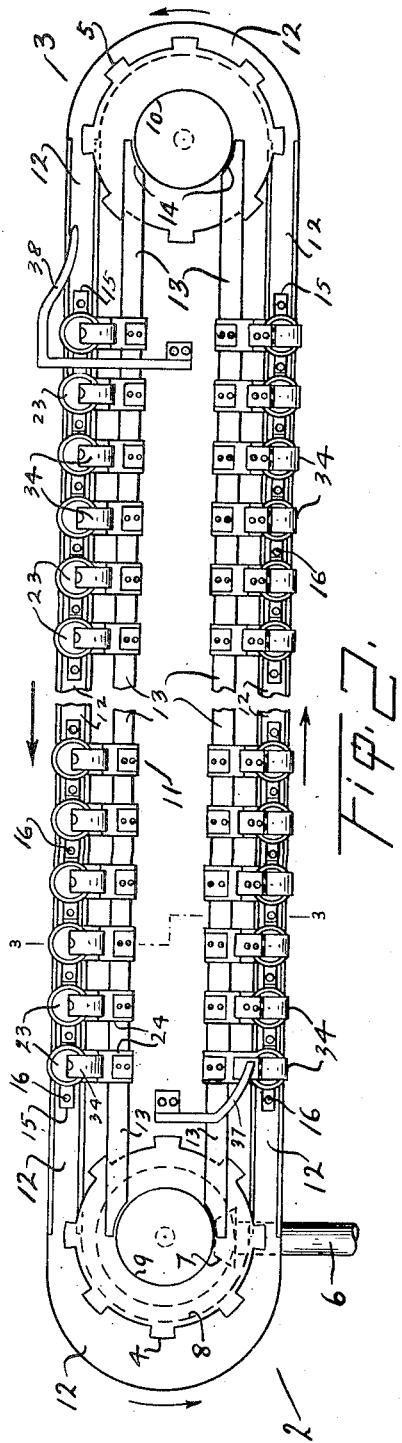
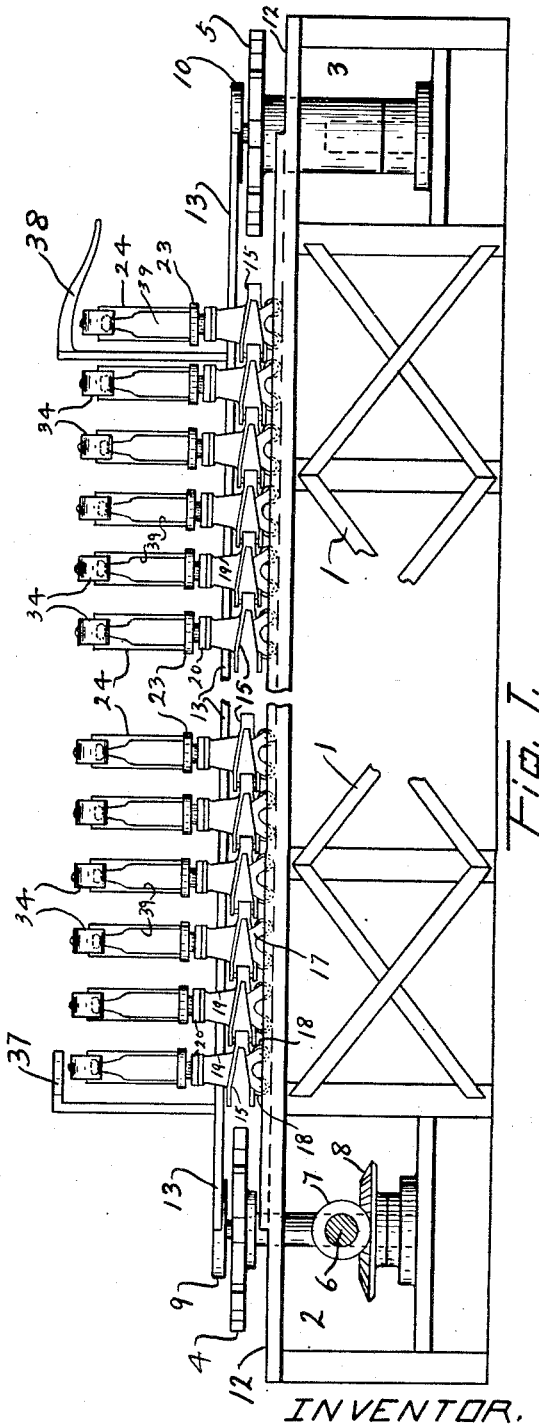
INVENTOR.
James Henry Sephton
by Fetherstonhaugh & Co
Attys.

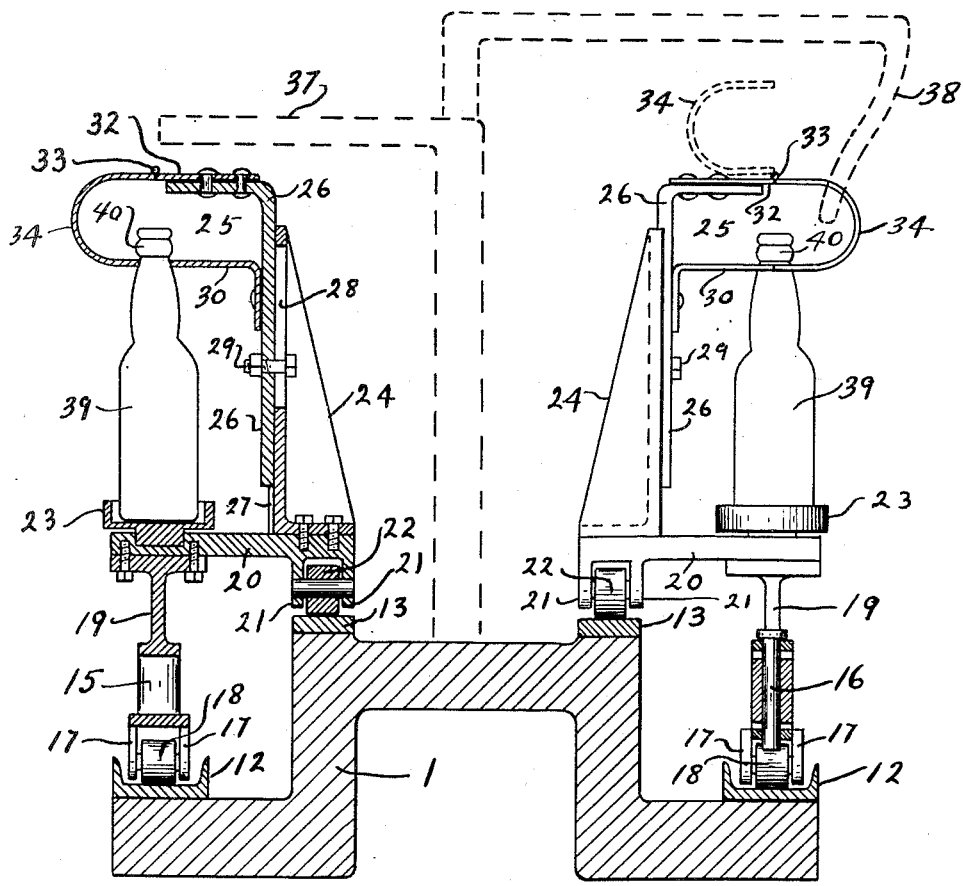
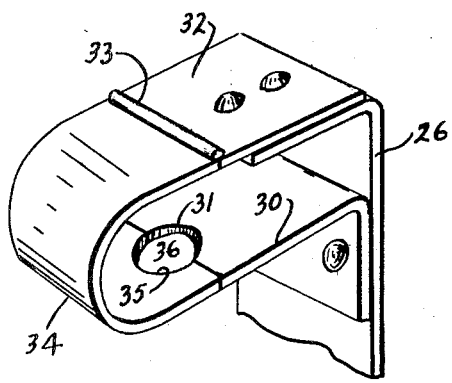

Patented May 1, 1928.

1,668,427

UNITED STATES PATENT OFFICE.

JAMES HENRY SEPHTON, OF HAMILTON, ONTARIO, CANADA, ASSIGNOR TO THE DOMINION GLASS COMPANY, LIMITED, OF MONTREAL, CANADA.

BOTTLE MANUFACTURE.

Application filed May 12, 1927. Serial No. 190,917.

My invention relates to improvements in bottle manufacture and the object of the invention is to increase the speed at which a bottle making machine may be operated by providing a bottle supporting and conveying apparatus adapted to receive delivery of the bottles from the bottle making machine and in which provision is made for supporting the weight of the bottle from the neck or finish at the top of the bottle so that the bottles may be delivered from the bottle making machine in a more or less semi-plastic state or at least in a not fully solidified or hardened state, in which state unless such provision were made for so supporting them, they would sag or become deformed or distorted before becoming fully solidified; a further object is to provide a conveyor which will transport the bottles from the bottle making machine to the lehr, thus eliminating labor hitherto involved in performing this operation manually.

Other objects will appear in the following specification.

My invention consists in the construction and arrangements of parts, all as hereinafter more particularly described and illustrated in the accompanying drawings in which:

Fig. 1 is a diagrammatic side elevation of an apparatus embodying my invention. In this view the apparatus is broken intermediately and the portion of an endless chain and parts carried thereby forming a conveyor are omitted at each end of the apparatus for greater clearness in the showing.

Fig. 2 is a plan view of Fig. 1.

Fig. 3 is a transverse section taken on the staggered line 3—3 of Fig. 2, showing the upper part only of the frame of the machine. In this view the positions of certain trip elements, the function of which will be later described, are indicated in broken lines.

Fig. 4 is a detached fragmentary perspective view of a bottle gripping element forming part of my invention.

In the drawings, like characters of reference indicate corresponding parts in the various views.

In the manufacture of bottles, the bottles must ordinarily be delivered from the bottle making machine in a sufficiently solidified or hardened state, that they will not sag or become deformed or distorted due to their own weight.

This involves an undesirable limiting of the speed at which the bottle making machine may be successfully operated.

If it were possible to take delivery of the bottles from the bottle making machine in a semi-plastic state, or before they had become fully solidified and hardened this machine might be successfully operated at considerably greater speed thus enabling a very valuable increase in production to be accomplished.

This is one of the principal objects of my invention and I accomplish it by providing an apparatus upon which the bottles may be placed as they are delivered from the bottle making machine in such a manner that the weight of the bottle is supported at the neck, or finish 40 at the top of the bottle so that the bottle cannot become deformed or sag even though it be in a not fully solidified state.

Formerly it has been customary to place the bottles upon a table, as they are delivered from the bottle making machine and then to transfer them to the lehr by hand labor.

In my apparatus they are placed directly upon a moving table or conveyor as they are delivered from the bottle making machine, which conveyor transports them to the lehr, so that the labor formerly involved in this transfer is eliminated.

In the form illustrated, my improved apparatus comprises an elongated main frame 1, which may be of any desired length suitable to the placement of the bottle making machine and lehr in any particular installation. One end 2 of this frame would be located adjacent to the point of delivery of the bottles from the bottle making machine, while the other end 3 would be adjacent to the lehr.

Supported in the frame 1 for rotation about vertical axes are two sprockets 4 and 5 which are located at either end of the frame, the sprocket 4 being at the end 2 and the sprocket 5 at the end 3.

The sprocket 4 is driven through a shaft 6 and bevel gears 7 and 8 while the sprocket 5 is an idler.

The shaft 6 could be driven from the bottle making machine in any suitable manner.

Concentric with the sprockets 4 and 5 and supported for free rotation thereabove are two circular discs 9 and 10, the purpose of which will be explained hereinafter.

Operatively mounted upon and extending between the sprockets 4 and 5 is a novel form of endless chain, which forms a conveyor extending longitudinally of the apparatus. This conveyor will be referred to collectively by the numeral 11 and the construction thereof and the component parts will be referred to by individual reference characters.

Supported upon the frame 1, is an outer and lower track 12 which track extends entirely about the apparatus.

Also supported above the frame 1 are two upper and inner tracks 13 which extend longitudinally of the apparatus and which are spaced above and inwardly from the track 12.

These tracks 13 are at the same level as the circular discs 9 and 10 and extend at each end into proximity to said discs, being cut away at the ends at 14. In this way the tracks 13 and discs 9 and 10 form what may be termed a continuous track.

The conveyor 11 comprises an endless chain formed from a plurality of links 15 hingedly connected together by means of pins 16, the links being so formed that the chain may be operatively mounted upon the sprockets 4 and 5.

Depending from the under side of each link 15 are brackets 17 within which are rotatably mounted rollers 18.

Extending upwardly from each link 15 is a web 19 and extending inwardly from the top of this web 19 is a horizontal arm 20 at the inner end of which are depending brackets 21 within which is rotatably mounted a roller 22.

The construction of the link and parts above mentioned is such that when the endless chain is operatively mounted upon the sprockets 4 and 5, the rollers 18 are supported upon the lower and outer track 12 while the rollers 22 are supported upon the upper and inner tracks 13.

Mounted above each link 15 is a horizontally disposed bottle supporting platform 23.

Secured to the inner end of each arm 20 and located above the roller 22 is an upright standard 24 and secured to each standard 24 is a bottle gripping element indicated collectively by the numeral 25.

Each of these bottle gripping elements 25 comprises a bracket 26 which fits within a recess 27 in the face of its corresponding standard 24.

The standard 24 is provided with an upright slot 28 and a bolt 29 extends through this slot and secures the bracket 26 upon the standard. The provision of the slot 28 permits alteration in the relative position of the bracket 26 upon the standard 24 as may be necessary to accommodate various types of bottles, as will be later explained.

Secured to each bracket 26 and extending outwardly therefrom is a lower arm 30, which is spaced above the platform 23. This arm 30 extends outwardly to a point substantially above the centre of the platform 23 and its outer edge is formed with a semi-circular notch 31.

From the upper end of each bracket 26, an upper arm 32 extends outwardly and its outer end is positioned substantially above the outer end of the lower arm 30.

Hingedly connected to the upper arm 32 by a hinge 33 is a U-shaped clip element 34 adapted to swing upwardly and downwardly about the hinge 33.

This element 34 is so formed that when in its lower position its free edge strikes against the outer end of the arm 30 and this free edge is formed with a semi-circular notch 35 registering with the notch 31 to form a circular opening 36 when the two are together, which opening 36 it will be noted is located vertically above the platform 23.

Supported above the frame of the machine adjacent to each end thereof are trip elements 37 and 38, which cooperate with the U-shaped clips 34 to raise and lower these clips during the operation of the machine as will be fully explained hereinafter.

The construction and operation of my apparatus is as follows.

As previously stated, the apparatus would be so placed that the end 2 thereof would be adjacent to the point of delivery of the bottles from the bottle making machine and the end 3 would be adjacent to the lehr.

The shaft 6 would be driven directly from the bottle making machine so that the conveyor 11 would be driven synchronously from the machine.

In the drawings in Figs. 1 and 2, a portion only of the conveyor is illustrated but it will of course be understood that it extends around the sprockets 4 and 5 and that as the shaft 6 rotates the sprocket 4 is driven through the medium of the gears 7 and 8 and in turn the sprocket 4 drives the conveyor 11.

In the illustration, the direction of travel of the conveyor is as indicated by the arrows in Fig. 2.

As the upper branch of the conveyor in Fig. 2 approaches the left hand end of the machine, the clip elements 34 are in their raised positions as shown in broken lines in Fig. 3.

As the conveyor passes around the sprocket 4, the operator places the bottles 39 upon the platforms 23, as they are delivered from the bottle making machine and when so placed the neck of the bottle lies within the notch 31 in the arm 30, the finish 40 on the neck lying immediately above the arm 30.

As the conveyor travels further, the trip 37 strikes against the backs of the raised clips 34, which as stated are in the positions shown in broken lines in Fig. 3.

In the movement past the trip 37, each clip 34 is overbalanced so that it falls into its lowered position, shown in full lines in Fig. 3 in which the notch 35 in this clip engages the bottle neck and as will be clear from an examination of Fig. 3 the neck of the bottle now extends through the opening 36, and the elements 30 and 34 constitute a bottle gripping element which grips the neck of the bottle immediately below the finish 40 and supports it therefrom so that the bottle cannot sag or become distorted or deformed due to its own weight, even though it be in a semiplastic or not fully solidified state.

In this way the bottles may safely be delivered from the bottle making machine before they are fully solidified and thus the speed of operation of the machine may be safely increased over that possible if the bottles must support themselves entirely when delivered therefrom.

These bottles are now carried along upon the lower branch of the conveyor in Fig. 2 and about the right hand sprocket 5 until they reach the trip 38. The arm of this trip is positioned to engage the clips 34 and as the conveyor passes this point, this trip moves the clips 34 into their raised positions.

By this time the bottles are fully solidified and the operator stationed at this point removes them from the conveyor and places them in the lehr.

This portion of the conveyor from which the bottles have been removed then passes along with the clips 34 raised, back to the left hand end of the apparatus where more bottles are again placed thereon and the above described cycle is repeated.

The tracks 12 and 13 support the conveyor throughout its entire length including the portion thereof which is passing around the sprockets 4 and 5. The discs 9 and 10 provide a support for the inner rollers 22 during this turning movement.

It will be noted that the elements 30 and 34 constitute releasable bottle gripping elements and that the trips 37 and 38 provide means for automatically actuating these bottle gripping elements at the desired points during the operation of the apparatus.

The brackets 26 may be adjusted to any desired height upon the standards 24 to accommodate various forms of bottles and by driving the conveyor synchronously from the bottle making machine it may be operated to successfully work in conjunction with the bottle making machine even though the machine may be delivering different forms or sizes of bottles.

From the foregoing it will be evident that I have devised improvements in apparatus of the class described whereby the objects of my invention have been attained.

Various modifications may be made in my invention without departing from the spirit thereof or the scope of the claims and therefore the exact forms shown are to be taken as illustrative only and not in a limiting sense and I desire, that only such limitations shall be placed thereon as are imposed by the prior art or are specifically set forth in the appended claims.

What I claim as my invention is:

1. Apparatus of the class described comprising, in combination, a main frame, a pair of opposed spaced apart sprockets supported by said frame for rotation about vertical axes, an endless chain operatively mounted upon and extending between said sprockets, said chain formed with a plurality of hingedly connected links, a horizontally disposed bottle supporting platform carried by each chain link, bottle gripping means carried by each chain link and spaced vertically above the corresponding platform, and driving means operatively associated with one of said sprockets.

2. Apparatus of the class described comprising, in combination, a main frame, a pair of opposed spaced apart sprockets supported by said frame for rotation about vertical axes, an endless chain operatively mounted upon and extending between said sprockets, said chain formed with a plurality of hingedly connected links, a horizontally disposed bottle supporting platform carried by each chain link, bottle gripping means carried by each chain link, and spaced vertically above the corresponding platform, tracks upon the frame positioned beneath the chain and forming supporting means therefor, and driving means operatively associated with one of said sprockets.

3. Apparatus of the class described comprising in combination, a main frame, a pair of opposed spaced apart sprockets supported by said frame for rotation about vertical axes, an endless chain operatively mounted upon and extending between said sprockets, said chain formed with a plurality of hingedly connected links, a horizontally disposed bottle supporting platform carried by each chain link, releasable bottle gripping means carried by each chain link and spaced vertically above the corresponding platform, and driving means operatively associated with one of said sprockets.

4. Apparatus of the class described comprising, in combination, a main frame, a pair of opposed spaced apart sprockets supported by said frame for rotation about vertical axes, an endless chain operatively mounted upon and extending between said sprockets, said chain formed with a plurality of hingedly connected links, a horizontally disposed bottle supporting platform carried by each chain link, releasable bottle gripping means carried by each chain link and spaced vertically above the corresponding platform, driving means operatively associated with one of said sprockets, and trip elements carried by the frame and co-acting with the bottle gripping means for automatically moving said gripping means into their different positions as desired during the operation of the apparatus.

5. Apparatus of the class described comprising, in combination, a main frame, a pair of opposed spaced apart sprockets supported by said frame for rotation about vertical axes, an endless chain operatively mounted upon and extending between said sprockets, said chain formed with a plurality of hingedly connected links, a horizontally disposed bottle supporting platform carried by each chain link, bottle gripping means carried by each chain link and spaced vertically above the corresponding platform, rollers carried by each link, chain supporting tracks carried by the frame upon which said rollers operate, and driving means operatively associated with one of said sprockets.

6. Apparatus of the class described comprising, in combination, an elongated main frame, a sprocket supported at each end thereof for rotation about a vertical axis, an endless chain operatively mounted upon and extending between said sprockets, said chain formed with a plurality of hingedly connected links, a horizontally disposed bottle supporting platform carried by each chain link, releasable bottle gripping means carried by each chain link and spaced vertically above the corresponding platform, a trip element mounted adjacent to each end of the frame and positioned to co-act with said bottle gripping means to move them into their gripping and released positions respectively as they move past said trips during the operation of the apparatus, and driving means operatively associated with one of said sprockets.

7. Apparatus of the class described comprising, in combination, an elongated main frame, a sprocket supported at each end thereof for rotation about a vertical axis, an endless chain operatively mounted upon and extending between said sprockets, said chain formed with a plurality of hingedly connected links, a horizontally disposed bottle supporting platform carried by each chain link, releasable bottle gripping means carried by each chain link and spaced vertically above the corresponding platform, a trip element mounted adjacent to each end of the frame and positioned to co-act with said bottle gripping means to move them into their gripping and released positions respectively as they move past said trips during the operation of the apparatus, tracks upon the frame positioned beneath the chain and forming supporting means therefor, and driving means operatively associated with one of said sprockets.

8. A bottle conveying apparatus comprising, in combination, a conveyor formed with a plurality of articulated units, means for driving the conveyor, a horizontally disposed bottle supporting platform carried by each unit, and bottle gripping means carried by each unit and spaced vertically above the corresponding bottle supporting platform.

9. A bottle conveying apparatus, comprising, in combination, a conveyor formed with a plurality of articulated units, means for driving the conveyor, a horizontally disposed bottle supporting platform carried by each unit, and releasable bottle gripping means carried by each unit and spaced vertically above the corresponding bottle supporting platform.

10. A bottle conveying apparatus comprising, in combination, a conveyor formed with a plurality of articulated units, means for driving the conveyor, a horizontally disposed bottle supporting platform carried by each unit, releasable bottle gripping means carried by each unit and spaced vertically above the corresponding bottle supporting platform, and trip elements operatively associated with said releasable bottle gripping means.

JAMES HENRY SEPHTON.